US 6,535,893 B1

(12) United States Patent
Friske et al.

(10) Patent No.: US 6,535,893 B1
(45) Date of Patent: Mar. 18, 2003

(54) METHOD FOR ESTIMATING THE ELAPSED TIME REQUIRED FOR A LOG APPLY PROCESS

(75) Inventors: Craig Alan Friske, San Jose, CA (US); James Alan Ruddy, Gilroy, CA (US); Akira Shibamiya, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/512,739

(22) Filed: Feb. 24, 2000

(51) Int. Cl.[7] .......................... G06F 12/00; G06F 17/30
(52) U.S. Cl. ...................... 707/204; 707/201; 707/202; 707/203
(58) Field of Search .............................. 707/100–104.1, 707/200–205

(56) References Cited

U.S. PATENT DOCUMENTS

| | | | |
|---|---|---|---|
| 5,574,897 A | | 11/1996 | Hermsmeier et al. |
| 5,721,915 A | * | 2/1998 | Sockut et al. ............... 707/200 |
| 5,826,063 A | | 10/1998 | Richter et al. |
| 5,933,820 A | * | 8/1999 | Beier et al. ..................... 707/1 |
| 6,026,412 A | * | 2/2000 | Sockut et al. ............... 707/200 |
| 6,070,170 A | * | 5/2000 | Friske et al. ................ 707/200 |
| 6,122,640 A | * | 9/2000 | Pereira ........................ 707/100 |
| 6,125,370 A | * | 9/2000 | Courter et al. ................. 707/10 |
| 6,144,970 A | * | 11/2000 | Bonner et al. .................. 707/2 |
| 6,411,964 B1 | * | 6/2002 | Iyer et al. .................... 707/200 |

FOREIGN PATENT DOCUMENTS

| | | |
|---|---|---|
| JP | 06-67944 | 3/1994 |
| JP | 10333946 | 12/1998 |

OTHER PUBLICATIONS

Craig Friske et al., "Online Reorganization: With DB2 for OS/390 v. 5, 24×7 Data Systems Gain New Support", DB2 Magazine Online, DB2 Magazine Online Extra Feature Fall 1998, http://www.db2mag.com/98fextra.html, pp. 1–9.

Zou Chendong et al., "Safely and Efficiently Updating References During On–line Reorganization", Proceedings of the 24th International Conference on Very–Large Databases, New York, NY, USA, Aug. 24–27, 1998 pp. 512–522 (1pg Abstract only).

G. H. Sockut et al., "A Method for On–line Reorganization of a Database", IBM Systems Journal, vol. 36, No. 3, pp. 411–436, 1997.

(List continued on next page.)

Primary Examiner—John Breene
Assistant Examiner—Linh Black
(74) Attorney, Agent, or Firm—Gates & Cooper LLP

(57) ABSTRACT

A reorganizer utility performs an online reorganization of a database that provides applications with concurrent access to data during an iterative process of log apply operations to a shadow version of the data. The reorganizer continues this iterative process of log apply operations until an estimate of an elapsed time necessary to complete a last iteration is less than or equal to a user-specified maximum length of time that read-only (RO) access may be provided to the data. When this threshold is reached, the reorganizer performs the last iteration, which includes draining all applications making modifications to the data; allowing read-only access to the data, performing log apply operations against the shadow version of the data, and then switching all of the applications to the shadow data.

57 Claims, 2 Drawing Sheets

OTHER PUBLICATIONS

C. Baru et al., "Data Reorganization in Parallel Database Systems", Proceedings of the IEEE Workshop on Advances in Parallel and Distributed Systems, pp. 102–107, Jan. 1989, (1pg Abstract only).

J.E. Stromme, "On–line Extension of CHILL Systems", Proceedings of the 5$^{th}$ CHILL Conference, pp 286–294, 1990, (1 pg Abstract only).

D. P. Batra, "Response Time Analysis for Computer Database Reorganization with Concurrent Usage and Changeover State", Def. Sci. J., vol. 39, No. 1., Jan. 1989, pp. 33–41.

B. T. Bennett et al., Permutation Clustering: An Approach to On–line Storage Reorganization, IBM Journal of Research and Development, vol. 21, No. 6, pp. 528–533, Nov. 1977. (1pg Abstract only).

* cited by examiner

METHOD FOR ESTIMATING THE ELAPSED TIME REQUIRED FOR A LOG APPLY PROCESS

BACKGROUND OF THE INVENTION

1. Field of the Invention.

The present invention relates to online reorganization of a database, and more particularly, to a method for estimating the elapsed time required for a log apply process to complete during online reorganization of the database.

2. Description of Related Art.

Over time and with frequent use, databases often become disorganized. Accordingly, numerous attempts have been made to reorganize such databases. Reorganization of a database includes changing some aspect of the logical and/or physical arrangement of the database. Most database management systems (DBMS's) provide some type of reorganizer utility.

Since many applications require 24×7 availability of databases, there has been increasing demand to mini any outages caused by utilities such as reorganizers. An online reorganizer minimizes outages by performing most of its processing while other applications still have access to the database.

One technique for reorganizing databases online is described in U.S. Pat. No. 5,721,915, filed Jun. 1, 1995, by Gary Sockut et al., entitled "Interaction Between Application of a Log and Maintenance of a Table That Maps Record Identifiers During Online Reorganization of a Database", which is incorporated by reference herein. This patent describes a technique for reorganizing a table space, wherein data is copied from an old area to a new area in reorganized form and then log records are applied to the data in the new area. Throughout most of the reorganization, applications still have access through the DBMS' normal facilities to read and write data to the old area. The DBMS also uses its normal facilities to record any modifications to the old area that occur into the log. Finally, at the end of the reorganization, the applications' access is switched from the old area to the new area.

Nonetheless, applications cannot modify the data during certain phases of the reorganization. What is needed, then, is a system that allows the user to specify the maximum amount of time that applications can be excluded from the data (either completely or limited to read-only access), and only allow the reorganizer to proceed if it can perform its operations within the specified amount of time.

SUMMARY OF THE INVENTION

To overcome the limitations in the prior art described above, and to overcome other limitations that will become apparent upon reading and understanding the present specification, the present invention discloses a method, apparatus, and article of manufacture for performing online reorganization of a database. A reorganizer utility performs the online reorganization in a manner that provides applications with concurrent access to data during an iterative process of log apply operations to a shadow version of the data. The reorganizer continues this iterative process of log apply operations until an estimate of an elapsed time necessary to complete a last iteration is less than or equal to a user-specified maximum length of time that read-only (RO) access may be provided to the data. When this threshold is reached, the reorganizer performs the last iteration, which includes draining all applications making modifications to the data; allowing read-only access to the data, performing log apply operations against the shadow version of the data, and then switching all of the applications to the shadow data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
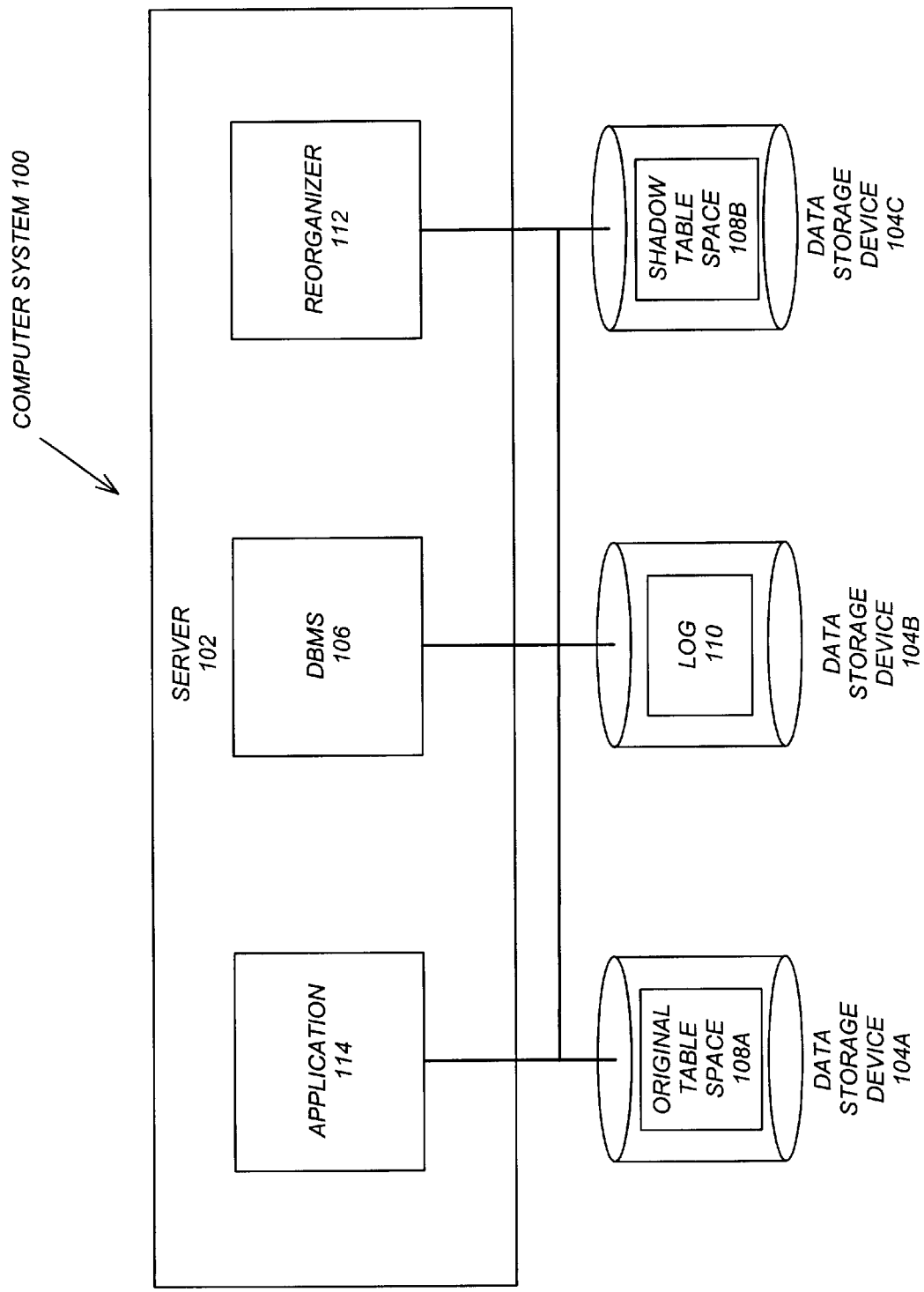
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a computer system 100 is comprised of one or more servers 102, each of which is connected to one or more data storage devices 104A–C. The server 102 executes database management system (DBMS) software 106 that manages one or more databases having one or more tables, known as a table space 108, on the data storage devices 104A–C. In addition, the DBMS software 106 manages a log 110 for transaction control. The server 102 also executes reorganizer software 112 that reorganizes the table spaces 108A–B stored on the data storage devices 104A and 104C, wherein this online reorganization comprises a logical and/or physical arrangement of the table space 108A. Finally, the server 102 executes applications 114 that read and write data to the table spaces 108A–B stored on the data storage devices 104, wherein the writing of data to the table spaces 108A–B is reflected in the log 110.

Generally, the DBMS 106, table spaces 108A–B, log 110, reorganizer 112, and applications 114 comprise logic and/or data that is embodied in or retrievable from a device, medium, carrier, or signal, e.g., a memory, data storage devices 104A–C, a remote device coupled to the computer system 100 by a data communications device, etc. Moreover, these logic and/or data, when read, executed, and/or interpreted by the computer system.100, cause the computer system 100 to perform the steps necessary to implement and/or use the present invention.

Thus, the present invention may be implemented as a method, system, or article of manufacture using standard programming and/or engineering techniques to produce software, firmware, hardware, or any combination thereof. The term "article of manufacture", or alternatively, "computer program carrier", as used herein is intended to encompass logic and/or data accessible from any device, medium, carrier, or signal. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Online Reorganization

According to the preferred embodiment, the reorganizer 112 first records a starting position for the log 110, known as a starting relative byte address (RBA). At any time, the starting RBA of the log 110 is the position where the next log 110 record is written. An RBA is sometimes called a log 110 record sequence number (LRSN).

After recording the starting RBA of the log 110, the reorganizer 112 reorganizes the data and indexes of the original table space 108A into a copy known as the shadow table space 108B. The reorganizer 112 also generates an image copy of the shadow table space 108B (not shown) for recovery purposes.

After loading the shadow table space 108B, the reorganizer 112 records an ending position for the log 110, known as the ending relative byte address (RBA). The data between the starting and ending RBAs comprise transactions that were applied to the original table space 108A during the loading of the shadow table space 108B.

Next, the reorganizer 112 performs log 110 apply operations to apply the log 110 records between the starting and ending RBAs to the shadow table space 108B. The data between the starting and ending RBAs comprise transactions that were applied to the original table space 108A during the previous log 110 apply operations. Upon completion of the log 110 apply operations, the ending RBA becomes the new starting RBA and the reorganizer 112 records a new ending RBA for the log 110. Using the new RBAs, the log 110 apply operations are performed again to apply the log 110 records between the new starting and ending RBAs to the shadow table space 108B. This iterative process may continue indefinitely.

At some point, however, the reorganizer 112 needs to prevent any further modifications from being made to the original table space 108A, so that no new records are added to the log 110. Thereafter, once the reorganizer 112 completes the last set of log 110 apply operations, it can switch applications 114 from the original table space 108A to the shadow table space 108B. In effect, the reorganized shadow table space 10,3B becomes the original table space 108A. After the switch is made, the applications 114 can again begin to make modifications to the original table space 108A.

A similar technique is described in U.S. Pat. No. 5,721,915, filed Jun. 1, 1995, by Gary Sockut et al., entitled "Interaction Between Application of a Log and Maintenance of a Table That Maps Record Identifiers During Online Reorganization of a Database", which patent is incorporated by reference herein.

In the preferred embodiment, the reorganizer 112 continues this iterative process of log 110 apply operations until an estimate of an elapsed time necessary to complete the log 110 apply operations from the starting position to the ending position of the log 110 against the shadow table space 108B is less than a specified maximum length of time that read-only (RO) access may be provided to the original table space 108A. When this threshold is reached, the reorganizer 112 performs the "last iteration".

During the last iteration, the reorganizer 112 drains the applications 114 that are writing to the original table space 108A to prevent any further modifications from being made to the original table space 108A, so that no new records are added to the log 110. Thereafter, the reorganizer 112 performs the last set of log 110 apply operations. Once the last set of log 110 apply operations are completed, the reorganizer 112 drains the applications 114 that are reading from the original table space 108A, and switches all applications 114 from the original table space 108A to the shadow table space 108B. After the switch is made, the applications 114 can begin to read the shadow table space 108B, as well as make modifications to the shadow table space 108B.

This technique for online reorganization is further described by the example in the following Table 1, which indicates application 114 access and reorganizer 112 actions from an initial point in time (T0) to a final point in time (Tn):

TABLE 1

| Application Access | Time Period | Reorganizer Actions |
|---|---|---|
| RW | T0 | - Start reorganization process |
| RW | T1 | - Load shadow table space 108 B from original table space 108A with reorganized data |
| RW | T2 | - Apply log 110 records from T0–T2 |
| RW | T3 | - Apply log 110 records from T2–T3 |
| RW | T(n – 1) | - Apply log 110 records from T3–T(n – 1) |
| RO | Tn | - Drain applications 114, apply log 110 records from T(n – 1) - Tn, append an incremental copy of the shadow table space 108 B to the image copy, and switch applications to the shadow table space 108 B. |

Table 1 indicates that applications 114 have full availability to the original table space 108A with read-write (RW) access through all phases of the online reorganization from T0 through T(n–1). However, during the last iteration of the log 110 apply operations for T(n–1) to Tn, applications 114 that are writing to the original table space 108A are drained, so that the applications 114 only have read-only (RO) access to the original table space 108A. Moreover, during this last iteration, the reorganizer 112 must read the remaining log 110 records, apply the log 110 records to the shadow table space 108B, append an incremental copy of the shadow table space 108B to an image copy of the shadow table space 108B (not shown) after the log 110 apply operations are completed, and then switch the applications 114 from the original table space 108A to the shadow table space 108B.

In the preferred embodiment, users can specify a maximum amount of time that read-only (RO) access to the original table space 108A can be endured. Only if the reorganizer 112 can perform the next iteration of log 110 apply operations (as well as the other necessary actions) within this specified amount of time does it perform the last iteration. This requires that the reorganizer 112 derive an estimate of an elapsed time necessary to complete the log 110 apply operations from the starting position to the ending position of the log 110 against the shadow table space 108B, as well as the other actions of the last iteration.

The ability to properly estimate the elapsed time necessary for the last iteration allows the reorganizer 112 to perform online Reorganization in an optimal manner. If the estimate is too large, the effect will be that there is an additional iteration of the log 110 apply operations and the overall time to complete the online reorganization will take longer. If the estimate is too small, then the maximum amount of time that read-only (RO) access to the original table space 108A can be endured may be exceeded. For the purposes of online reorganization, it is better for the reorganizer 112 to take somewhat longer to complete than to have read-only (RO) access in effect longer than desired.

Generally, the estimate differs depending on the iteration (e.g., whether first iteration or subsequent iterations), and whether the system comprises a data-sharing (DS) environment or not. Specifically, the derived estimate of the elapsed time necessary for the last iteration depends on the following variables:

LRD—the elapsed time for Log ReaDs in the log 110 from the starting position to the ending position.

LAP—the elapsed time for Log APply operations.

IC—the elapsed time to append an incremental copy of the shadow table space 108B to an image copy of the shadow table space 108A.

LRDRATE—an approximate rate for performing Log ReaD operations.

LAPRATE—an approximate rate for performing Log APply operations.

ICRATE—an approximate rate for appending an incremental copy of the shadow table space 108B to an image copy of the shadow table space 108B.

RBA—a relative byte address of the log 110.

LRs—the number records in the log 110.

NPts—the number of pages in the table space 108A–B.

MPs—the number of modified pages due to log 110 apply operations.

TIME—an elapsed time.

starting—the recorded starting position in the log 110 for a particular iteration.

ending—the recorded ending position of the log 110 for a particular iteration.

First Iteration

To determine whether a first iteration should be the last iteration, the derived estimate for the elapsed time necessary to complete the last iteration is calculated as follows:

$$\text{Elapsed Time} = LRD + LAP + IC$$

where $$LRD = RBA(\text{ending} - \text{starting})/LRDRATE$$

$$LAP = \#LRs(\text{ending} - \text{starting})/LAPRATE$$

$$IC = \#MPs/ICRATE$$

If the #MPs is not known, then IC can be estimated as follows:

$$IC = NPts * (1 - (1 - 1/NPts)^{**\#LRs(\text{ending} - \text{starting})})/ICRATE$$

Subsequent Iterations

Once the first iteration has been completed, there is more information available that allows the derivation of better estimates during subsequent iterations (i.e., 2–n). In particular, it is known how long it took to read and apply a given number of log 110 records during the previous iteration.

Thus, the estimates for subsequent iterations can then be calculated as follows:

$$\text{Elapsed Time} = ((\#LRs(\text{ending} - \text{starting}) * \text{TIME}(\text{previous ending} - \text{previous starting})/\#LRs(\text{previous ending} - \text{previous starting})) + IC$$

Merged Log Modifications (e.g. Data Sharing):

In a data sharing (DS) environment, the calculations to estimate the first iteration's time in reading the log 110 (LRD) must be modified because the #LRs are not available and the reading of the logs 110 involves merging the individual logs 110 kept by each member of a DS group into a group log 110. For a DS environment, the following changes are made:

LRDRATE2—approximate amount of time required to merge and read logs in the DS environment.

TPS—average # of transactions per second in a DS group.

AVGTLGSZ—average # bytes logged for typical transaction

MBytes—number of bytes to read, which is calculated as follows:

$$\text{TIME}(\text{ending} - \text{starting}) * TPS * AVGTLGSZ$$

In this situation, the LRD is calculated as follows:

$$LRD = \#MBytes/LDRATE2$$

For subsequent iterations within a DS environment, the same standard formulae for iterations 2–n in the non-data sharing environment is used.

Miscellaneous Modifications:

MThe estimate used for subsequent iterations assumes that log 110 records were processed in the previous iteration, so that #LRs(ending–starting) is not zero. It is possible that iterations of log 110 apply operations will continue indefinitely, even if there are no log 110 records to apply. In this case, whenever an estimated time is needed in subsequent iterations and the previous iteration processed no log 110 records, then the estimates from the first or a previous iteration should be used.

The Logic of the Reorganizer

Figure 2:
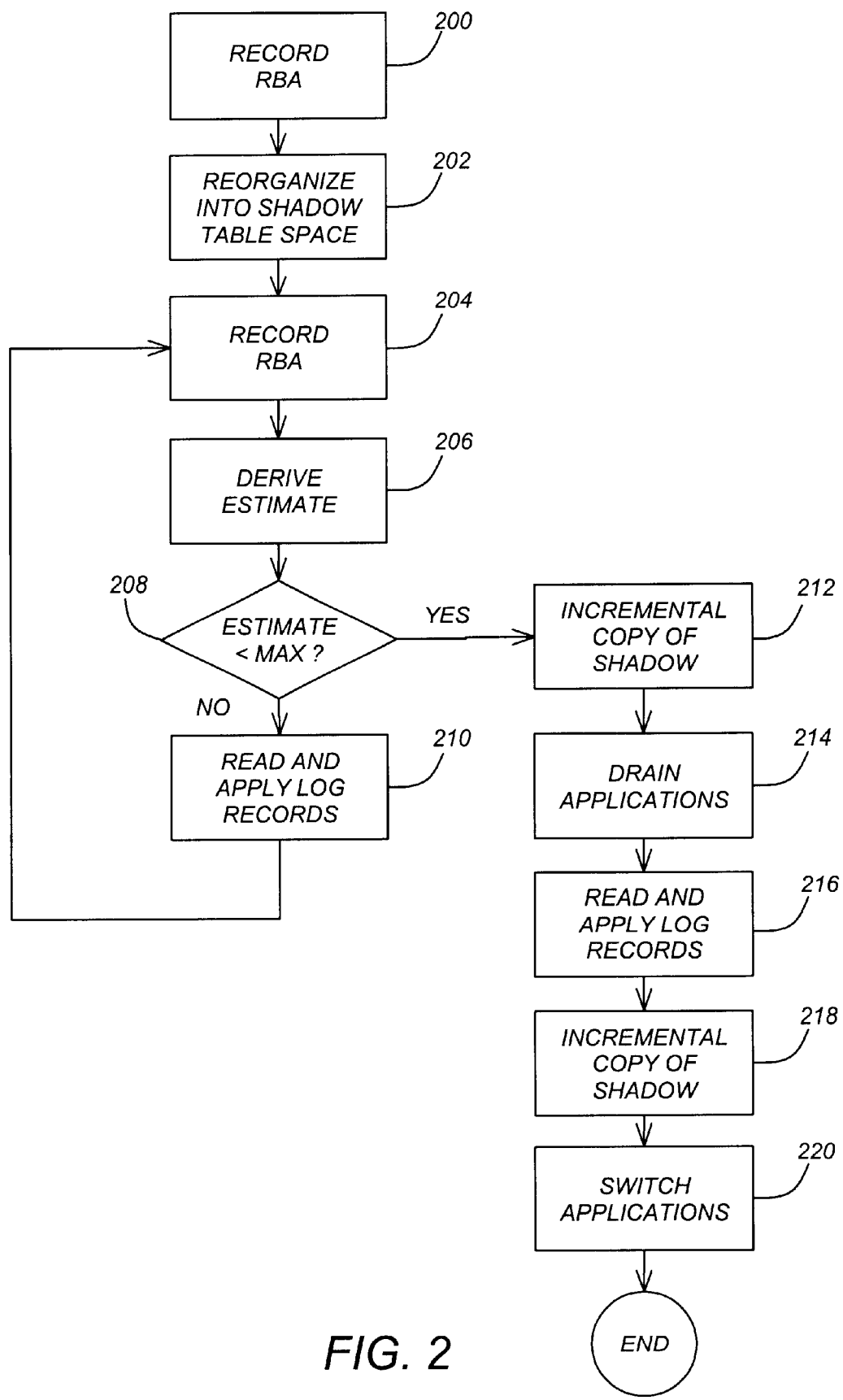
FIG. 2 is a flowchart of the logic used by a reorganizer according to the preferred embodiment of the present invention.

FIG. 2 is a flowchart of the logic used by the reorganizer 112 according to the preferred embodiment of the present invention.

Block 200 represents the organizer 112 recording the RBAs of the log 110.

Block 202 represents the organizer 112 reorganizing the original table space 108A into the shadow table space 108B, by unloading the original table space 108A, sorting the contents of the original table space 108A, and reloading the original table space 108A into the shadow table space 108B. In addition, Block 202 represents the organizer 112 making an image copy of the shadow table space 108B (for recovery purposes).

Block 204 represents the organizer 112 recording the RBAs of the log 110.

Block 206 represents the organizer 112 deriving the estimate of the elapsed time necessary to complete a last iteration. As described above, this estimate is derived differently depending on whether this is the first iteration or one of the 2–n iterations. In addition, as described above, this estimate is derived differently in a data sharing (DS) environment.

Block 208 is a decision block that represents the organizer 112 determining whether the derived estimate of the elapsed time necessary to complete the last iteration is less than or equal to the user-specified maximum length of time that read-only access is provided to the table space 108A. If not, control transfers to Block 210; otherwise, control transfers to Block 212.

Block 210 represents the organizer 112 performing the iterative log apply operations. Specifically, this Block represents the organizer 112 reading log 110 records between the current RBA (starting position) and the new RBA (ending position), and then applying the log 110 records to the shadow table space 108B. Thereafter, control returns to Block 204.

Block 212 represents the organizer 112 appending an incremental copy of the shadow table space 108B to the image copy of the shadow table space 108B made in Block 202 above.

Block 214 represents the organizer 112 sending a "drain" command to all applications 114 that are writing to the original table space 108A. In the preferred embodiment, the organizer 112 remains at this Block until it receives an acknowledgment back from the applications 114.

Block 216 represents the organizer 112 performing the iterative log apply operations. Specifically, this Block represents the organizer 112 reading log 110 records between the current RBA and the new RBA, and then applying the log 110 records to the shadow table space 108B.

Block 218 represents the organizer 112 appending a final incremental copy of the shadow table space 108B to the image copy of the shadow table space 108B made in Block 202 above.

Block 220 represents the organizer 112 switching all of the applications 114 from the original table space 108A to the shadow table space 108B, and allowing full read-write access to the shadow table space 108B. At this point, the shadow table space 108B becomes the original table space 108A for the purposes of subsequent reorganizations.

Thereafter, the logic terminates.

CONCLUSION

This concludes the description of the preferred embodiment of the invention. The following describes some alternative. embodiments for accomplishing the present invention. For example, any type of computer, such as a mainframe, minicomputer, or personal computer, could be used with the present invention. In addition, any software program providing database management functions could benefit from the present invention.

In summary, the present invention discloses a method, apparatus, and article of manufacture for performing online reorganization of a database. A reorganizer utility performs the online reorganization in a manner that provides applications with concurrent access to data during an iterative process of log apply operations to a shadow version of the data. The reorganizer continues this iterative process of log apply operations until an estimate of an elapsed time necessary to complete a last iteration is less than or equal to a user-specified maximum length of time that read-only (RO) access may be provided to the data. When this threshold is reached, the reorganizer performs the last iteration, which includes draining all applications making modifications to the data; allowing read-only access to the data, performing log apply operations against the shadow version of the data, and then switching all of the applications to the shadow data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for performing online reorganization of a database, comprising:

(a) copying an original table space stored on the computer to a shadow table space;

(b) identifying a starting and ending position for a log recording modifications made to original table space;

(c) deriving an estimate of an elapsed time necessary for a last iteration against the shadow table space using the identified starting and ending positions;

(d) when the derived estimate of the elapsed time necessary for a last iteration is greater than a specified maximum length of time that read-only access may be provided to the original table space, performing the log apply operations from the starting position to the ending position of the log against the shadow table space and repeating the method from step (b); and (e) when the derived estimate of the elapsed time necessary for a last iteration is less than or equal to the specified maximum length of time that read-only access may be provided to the original table space, draining all applications making modifications to the original table space; allowing read-only access to the original table space, performing the log apply operations from the starting position to the ending position of the log against the shadow table space, and then switching all of the applications from the original table space to the shadow table space.

2. The method of claim 1, wherein the copying step (a) comprises reorganizing the original table space into the shadow table space, by unloading the original table space, sorting the original table space, and reloading the original table space into the shadow table space.

3. The method of claim 1, wherein the copying step (a) further comprises making an image copy of the shadow table space.

4. The method of claim 1, wherein the identifying step (b) further comprises updating the starting and ending positions based on the log apply operations previously performed.

5. The method of claim 1, wherein the deriving step (c) comprises deriving the estimate differently in a data sharing environment.

6. The method of claim 1, wherein the deriving step (c) comprises deriving the estimate differently depending on an iteration of the log apply operations.

7. The method of claim 1, wherein the derived estimate of the elapsed time necessary for the last iteration comprises:

$$\text{Elapsed Time} = LRD + LAP + IC$$

wherein LRD is an elapsed time for log read operations from the log from the starting position to the ending position, LAP is an elapsed time for the log apply operations for records read from the log, and IC is an elapsed time to append an incremental copy of the shadow table space to the image copy of the shadow table space after the log apply operations have been performed.

8. The method of claim 7, wherein the LRD comprises:

$$LRD = RBA(\text{ending} - \text{starting})/LRDRATE$$

wherein RBA is a relative byte address value of the log and LRDRATE is an approximate rate for performing the log read operations.

9. The method of claim 7, wherein the LAP comprises $$LAP = \#LRs(\text{ending} - \text{starting})/LAPRATE$$

wherein #LRs is a number records written to the log and LAPRATE is an approximate rate for performing the log apply operations.

10. The method of claim 7, wherein the IC comprises:

$$IC = \#MPs/ICRATE$$

wherein #MPs is a number of modified pages due to log apply operations and ICRATE is an approximate rate for appending the incremental copy of the shadow table space to the image copy of the shadow table space after the log apply operations have been performed.

11. The method of claim 7, wherein the IC comprises:

$$IC = NPts*(1-(1-1/NPts)**\#LRs(ending-starting))/ICRATE$$

when the #MPs is not known, wherein NPts is a number of pages in the original table space, #LRs is a number records written to the log, and ICRATE is an approximate rate for appending the incremental copy of the shadow table space to the image copy of the shadow table space after the log apply operations have been performed.

12. The method of claim 7, further comprising revising the derived estimate after an initial iteration of the log apply operations has completed.

13. The method of claim 7, wherein the revised estimate is based on a time required to read a record from the log and apply the record to the shadow table space during the initial iteration of the log apply operation.

14. The method of claim 13, wherein the revised estimate of the elapsed time necessary for the last iteration comprises:

$$\text{Elapsed Time} = ((\#LRs(ending-starting) * TIME(previous\ ending-previous\ starting)/\#LRs(previous\ ending-previous\ starting)) + IC$$

wherein #LRs is a number records written to the log, Time is an elapsed time, and IC is an elapsed time to append an incremental copy of the shadow table space to the image copy of the shadow table space after the log apply operations have been performed.

15. The method of claim 7, wherein the LRD comprises:

$$LRD = \#MBytes/LRDRATE2$$

wherein #MBytes is a number of bytes to read and LRDRATE2 is an approximate rate for performing the log read operations in a data sharing environment.

16. The method of claim 15, wherein the #MBytes comprises:

$$\#MBytes = TIME\ (ending-starting)*TPS*AVGTLGSZ$$

wherein TPS is an average estimate for a number of transactions per second in a data sharing group, TIME is an elapsed time, and AVGTLGSZ is an average number of bytes logged for a typical transaction.

17. The method of claim 1, wherein the draining step (e) further comprises waiting for the applications to drain before performing the log apply operations.

18. The method of claim 1, wherein the draining step (e) further comprises appending an incremental copy of the shadow table space to the image copy of the shadow table space after the log apply operations have been performed.

19. The method of claim 1, wherein the draining step (e) further comprises allowing the applications to have full read-write access to the shadow table space after being switched.

20. A computer-implemented apparatus for performing online reorganization of a database, comprising:
(a) a computer,
(b) logic, performed by the computer, for:
(1) copying an original table space stored on the computer to a shadow table space;
(2) identifying a starting and ending position for a log recording modifications made to original table space;
(3) deriving an estimate of an elapsed time necessary for a last iteration against the shadow table space using the identified starting and ending positions;
(4) when the derived estimate of the elapsed time necessary for a last iteration is greater than a specified maximum length of time that read-only access may be provided to the original table space, performing the log apply operations from the starting position to the ending position of the log against the shadow table space and repeating the method from step (b); and
(5) when the derived estimate of the elapsed time necessary for a last iteration is less than or equal to the specified maximum length of time that read-only access may be provided to the original table space, draining all applications making modifications to the original table space; allowing read-only access to the original table space, performing the log apply operations from the starting position to the ending position of the log against the shadow table space, and then switching all of the applications from the original table space to the shadow table space.

21. The apparatus of claim 20, wherein the logic for copying (1) comprises logic for reorganizing the original table space into the shadow table space, by unloading the original table space, sorting the original table space, and reloading the original table space into the shadow table space.

22. The apparatus of claim 20, wherein the logic for copying (1) further comprises logic for making an image copy of the shadow table space.

23. The apparatus of claim 20, wherein the logic for identifying (2) further comprises logic for updating the starting and ending positions based on the log apply operations previously performed.

24. The apparatus of claim 20, wherein the logic for deriving (3) comprises logic for deriving the estimate differently in a data sharing environment.

25. The apparatus of claim 20, wherein the logic for deriving (3) comprises logic for deriving the estimate differently depending on an iteration of the log apply operations.

26. The apparatus of claim 20, wherein the derived estimate of the elapsed time necessary for the last iteration comprises:

$$\text{Elapsed Time} = LRD + LAP + IC$$

wherein LRD is an elapsed time for log read operations from the log from the starting position to the ending position, LAP is an elapsed time for the log apply operations for records read from the log, and IC is an elapsed time to append an incremental copy of the shadow table space to the image copy of the shadow table space after the log apply operations have been performed.

27. The apparatus of claim 26, wherein the LRD comprises:

$$LRD = RBA(ending-starting)/LRDRATE$$

wherein RBA is a relative byte address value of the log and LRDRATE is an approximate rate for performing the log read operations.

28. The apparatus of claim 26, wherein the LAP comprises $$LAP = \#LRs(ending-starting)/LAPRATE$$

wherein #LRs is a number records written to the log and LAPRATE is an approximate rate for performing the log apply operations.

29. The apparatus of claim 26, wherein the IC comprises:

$$IC = \#MPs/ICRATE$$

wherein #MPs is a number of modified pages due to log apply operations and ICRATE is an approximate rate for appending the incremental copy of the shadow table space to the image copy of the shadow table space after the log apply operations have been performed.

30. The apparatus of claim 26, wherein the IC comprises:

$$IC = NPts*(1-(1-1/NPts)**\#LRs(ending-starting))/ICRATE$$

when the #MPs is not known, wherein NPts is a number of pages in the original table space, #LRs is a number records written to the log, and ICRATE is an approximate rate for appending the incremental copy of the shadow table space to the image copy of the shadow table space after the log apply operations have been performed.

31. The apparatus of claim 26, further comprising logic for revising the derived estimate after an initial iteration of the log apply operations has completed.

32. The apparatus of claim 26, wherein the revised estimate is based on a time required to read a record from the log and apply the record to the shadow table space during the initial iteration of the log apply operation.

33. The apparatus of claim 32, wherein the revised estimate of the elapsed time necessary for the last iteration comprises:

$$\text{Elapsed Time} = ((\#LRs(ending-startng)* \text{TIME}(previous\ ending- previous\ starting) /\#LRs(previous\ ending - previous\ starting)) + IC$$

wherein #LRs is a number records written to the log, Time is an elapsed time, and IC is an elapsed time to append an incremental copy of the shadow table space to the image copy of the shadow table space after the log apply operations have been performed.

34. The apparatus of claim 26, wherein the LRD comprises:

$$LRD = \#MBytes/LRDRATE2$$

wherein #MBytes is a number of bytes to read and LRDRATE2 is an approximate rate for performing the log read operations in a data sharing environment.

35. The apparatus of claim 34, wherein the #MBytes comprises:

$$\#MBytes = TIME(ending-starting)* TPS*AVGTLGSZ$$

wherein TPS is an average estimate for a number of transactions per second in a data sharing group, TIME is an elapsed time, and AVGTLGSZ is an average number of bytes logged for a typical transaction.

36. The apparatus of claim 20, wherein the logic for draining step (5) further comprises logic for waiting for the applications to drain before performing the log apply operations.

37. The apparatus of claim 20, wherein the logic for draining (5) further comprises logic for appending an incremental copy of the shadow table space to the image copy of the shadow table space after the log apply operations have been performed.

38. The apparatus of claim 20, wherein the logic for draining (5) further comprises logic for allowing the applications to have full read-write access to the shadow table space after being switched.

39. An article of manufacture embodying logic for performing a method of online reorganization of a database, the method comprising:

(a) copying an original table space stored on the computer to a shadow table space;

(b) identifying a starting and ending position for a log recording modifications made to original table space;

(c) deriving an estimate of an elapsed time necessary for a last iteration against the shadow table space using the identified starting and ending positions;

(d) when the derived estimate of the elapsed time necessary for a last iteration is greater than a specified maximum length of time that read-only access may be provided to the original table space, performing the log apply operations from the starting position to the ending position of the log against the shadow table space and repeating the method from step (b); and (e) when the derived estimate of the elapsed time necessary for a last iteration is less than or equal to the specified maximum length of time that read-only access may be provided to the original table space, draining all applications making modifications to the original table space; allowing read-only access to the original table space, performing the log apply operations from the starting position to the ending position of the log against the shadow table space, and then switching all of the applications from the original table space to the shadow table space.

40. The method of claim 39, wherein the copying step (a) comprises reorganizing the original table space into the shadow table space, by unloading the original table space, sorting the original table space, and reloading the original table space into the shadow table space.

41. The method of claim 39, wherein the copying step (a) further comprises making an image copy of the shadow table space.

42. The method of claim 39, wherein the identifying step (b) further comprises updating the starting and ending positions based on the log apply operations previously performed.

43. The method of claim 39, wherein the deriving step (c) comprises deriving the estimate differently in a data sharing environment.

44. The method of claim 39, wherein the deriving step (c) comprises deriving the estimate differently depending on an iteration of the log apply operations.

45. The method of claim 39, wherein the derived estimate of the elapsed time necessary for the last iteration comprises:

$$\text{Elapsed Time} = LRD + LAP + IC$$

wherein LRD is an elapsed time for log read operations from the log from the starting position to the ending position, LAP is an elapsed time for the log apply operations for records read from the log, and IC is an elapsed time to append an incremental copy of the shadow table space to the image copy of the shadow table space after the log apply operations have been performed.

46. The method of claim 45, wherein the LRD comprises:

$$LRD = RBA(ending-starting)/LRDRATE$$

wherein RBA is a relative byte address value of the log and LRDRATE is an approximate rate for performing the log read operations.

47. The method of claim 45, wherein the LAP comprises $$LAP = \#LRs(ending-starting)/LAPRATE$$

wherein #LRs is a number records written to the log and LAPRATE is an approximate rate for performing the log apply operations.

48. The method of claim 45, wherein the IC comprises:

$$IC=\#MPs/ICRATE$$

wherein #MPs is a number of modified pages due to log apply operations and ICRATE is an approximate rate for appending the incremental copy of the shadow table space to the image copy of the shadow table space after the log apply operations have been performed.

49. The method of claim 45, wherein the IC comprises:

$$IC=NPts(1-(1-1/NPts)^{**\#LRs(ending-starting)})/ICRATE$$

when the #MPs is not known, wherein NPts is a number of pages in the original table space, #LRs is a number records written to the log, and ICRATE is an approximate rate for appending the incremental copy of the shadow table space to the image copy of the shadow table space after the log apply operations have been preformed.

50. The method of claim 45, further comprising revising the derived estimate after an initial iteration of the log apply operations has completed.

51. The method of claim 45, wherein the revised estimate is based on a time required to read a record from the log and apply the record to the shadow table space during the initial iteration of the log apply operation.

52. The method of claim 51, wherein the revised estimate of the elapsed time necessary for the last iteration comprises:

$$\text{Elapsed Time}=((\#LRs(\text{ending}-\text{starting})* \text{TIME}(\text{previous ending}-\text{previous starting})/\#LRs(\text{previous ending}-\text{previous starting}))+IC$$

wherein #LRs is a number records written to the log, Time is an elapsed time, and IC is an elapsed time to append an incremental copy of the shadow table space to the image copy of the shadow table space after the log apply operations have been performed.

53. The method of claim 45, wherein the LRD comprises:

$$LRD=\#MBytes/LRDRATE2$$

wherein #MBytes is a number of bytes to read and LRDRATE2 is an approximate rate for performing the log read operations in a data sharing environment.

54. The method of claim 53, wherein the #MBytes comprises:

$$\#MBytes=\text{TIME}(\text{ending}-\text{starting})*TPS*AVGTLGSZ$$

wherein TPS is an average estimate for a number of transactions per second in a data sharing group, TIME is an elapsed time, and AVGTLGSZ is an average number of bytes logged for a typical transaction.

55. The method of claim 39, wherein the draining step (e) further comprises waiting for the applications to drain before performing the log apply operations.

56. The method of claim 39, wherein the draining step (e) further comprises appending an incremental copy of the shadow table space to the image copy of the shadow table space after the log apply operations have been performed.

57. The method of claim 39, wherein the draining step (e) further comprises allowing the applications to have full read-write access to the shadow table space after being switched.

* * * * *